United States Patent [19]

Hager et al.

[11] 4,194,643

[45] Mar. 25, 1980

[54] METHOD AND APPARATUS FOR FRIT-SEALING HIGH TEMPERATURE CRT FACEPLATE TO CONVENTIONAL CRT ENVELOPE

[75] Inventors: Adolph G. Hager, Pt. Pleasant; Philip F. Krzyzkowski, Middletown Township, Monmouth County, both of N.J.

[73] Assignee: The United States of America as represented by the Secretary of the Army, Washington, D.C.

[21] Appl. No.: 970,904

[22] Filed: Dec. 19, 1978

[51] Int. Cl.² ............... C03B 23/20; C03C 27/06; H01J 29/87
[52] U.S. Cl. .................... 220/2.1 A; 65/42; 65/43; 403/30
[58] Field of Search ............ 220/2.1 A, 2.1 R, 2.3 A, 220/2.3 R; 65/31, 42, 43; 403/270, 28, 29, 30; 313/317; 358/245; 427/64, 69, 70

[56] References Cited

U.S. PATENT DOCUMENTS

| | | | |
|---|---|---|---|
| 2,047,030 | 7/1936 | Orth | 403/28 X |
| 2,064,369 | 12/1936 | Biggs | 220/2.3 A X |
| 2,132,783 | 10/1938 | Goldmark | 220/2.3 A X |
| 2,167,431 | 7/1939 | Bowie | 220/2.3 X |
| 2,699,014 | 1/1955 | van Steenis | 220/2.1 A X |
| 2,728,009 | 12/1955 | Faulkner | 220/1.3 A X |
| 3,171,771 | 3/1965 | Badger et al. | 65/43 X |
| 3,190,738 | 6/1965 | Upton | 65/31 |
| 3,404,769 | 10/1968 | Bishop | 220/2.3 A |
| 3,451,579 | 6/1969 | Bishop | 313/317 X |
| 3,589,881 | 6/1971 | Langley et al. | 220/2.1 A X |

OTHER PUBLICATIONS

"Material Information" (Corning code 7052), Aug. 1977, by Corning Glass Works.
"Material Information" (Corning Code 1720), Sep. 1972, by Corning Glass Works.

*Primary Examiner*—Allan N. Shoap
*Attorney, Agent, or Firm*—Nathan Edelberg; Sheldon Kanars; Edward Goldberg

[57] ABSTRACT

A cathode ray tube has an envelope comprised of a first glass and a faceplate comprised of a second glass, both glasses having different thermal coefficients of expansion. The envelope and faceplate are joined by a cylindrical, stress-absorbing glass member flame-sealed at one end to the envelope and frit-sealed at the other end to the faceplate. Importantly, the thermal coefficient of expansion of the stress-absorbing member is less than the coefficients of either the envelope or the faceplate.

12 Claims, 2 Drawing Figures

METHOD AND APPARATUS FOR FRIT-SEALING HIGH TEMPERATURE CRT FACEPLATE TO CONVENTIONAL CRT ENVELOPE

GOVERNMENT LICENSE

The invention described herein may be manufactured and used by or for the Government, for governmental purposes, without the payment of any royalties thereon or therefor.

TECHNICAL FIELD

Broadly speaking, this invention relates to methods and apparatus for manufacturing cathode-ray tubes, and the like. More particularly, in a preferred embodiment, this invention relates to methods and apparatus for frit-sealing a high temperature CRT faceplate to a conventional CRT envelope.

BACKGROUND OF THE INVENTION

The manufacture of specialized cathode-ray tubes, for example, high-contrast CRT's using transparent phosphor-black absorption layer technology, has not proved to be easy. In particular, difficulty has been experienced in frit-sealing the high-temperature faceplate required under these circumstances to conventional CRT bodies. While not fully understood, the problem seems to lie in the fact that the thermal coefficient of expansion of the high-temperature faceplate is considerably less than the coefficient of expansion of the envelope. Thus, as the seal cools, the different expansion rates cause stress to be generated within the envelope-faceplate area, resulting in a failure of the seal.

SUMMARY OF THE INVENTION

The above, and other problems, have been solved by the instant invention which comprises a method of joining a first member having a first thermal coefficient of expansion to a second member having a second thermal coefficient of expansion. The method comprises the step of joining one end of a third member having a third thermal coefficient of expansion to the first member and also joining the other end of the third member to the second member, the third member acting as an intermediate stress-absorber and having a thermal coefficient of expansion which is less than both the first and the second thermal coefficients of expansion.

The invention and its mode of operation will be more fully understood from the following detailed description, when taken with the appended drawings, in which:

DETAILED DESCRIPTION OF THE INVENTION

Figure 1:
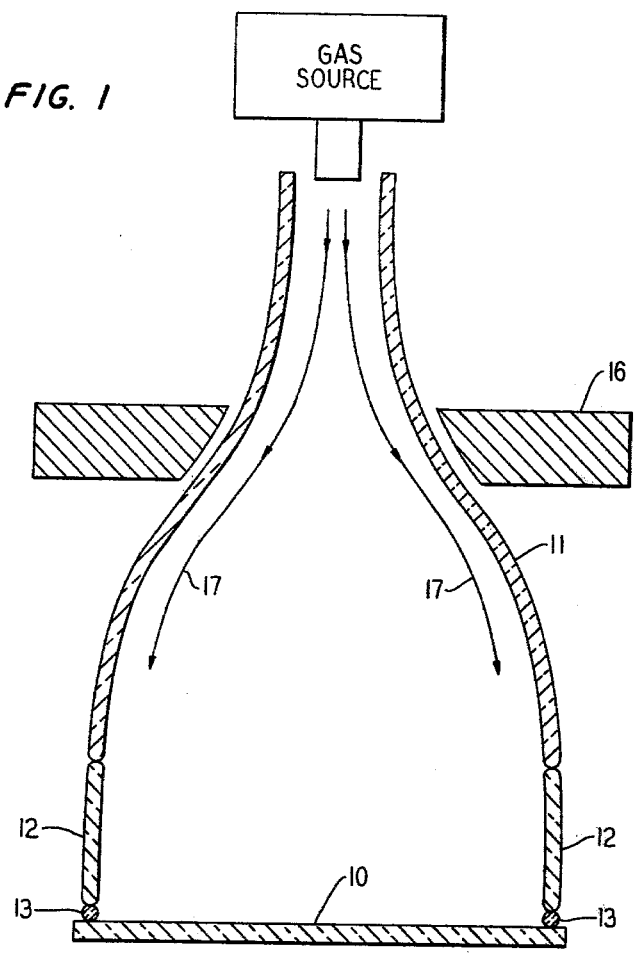
FIG. 1 is a cross-sectional view of an illustrative cathode-ray tube according to the invention.

As shown in FIG. 1, a high-temperature, alumina-silicate CRT faceplate 10, illustratively manufactured from Corning type 1720 or 1723 glass, is sealed to a conventional CRT envelope 11, illustratively manufactured from Corning type 7052 glass, by means of a cylinder 12 of uranium glass, illustratively Corning type 3320. Cylinder 12 is typically $\frac{1}{8}$ inch or greater in depth and has the same outer diameter as the funnel end of the envelope 11. As will be explained, cylinder 12 is sealed to faceplate 10 by some suitable vitreous frit 13, for example, Owens-Illinois SG-7. At the other end, cylinder 12 is flame-sealed to the CRT envelope.

Figure 2:
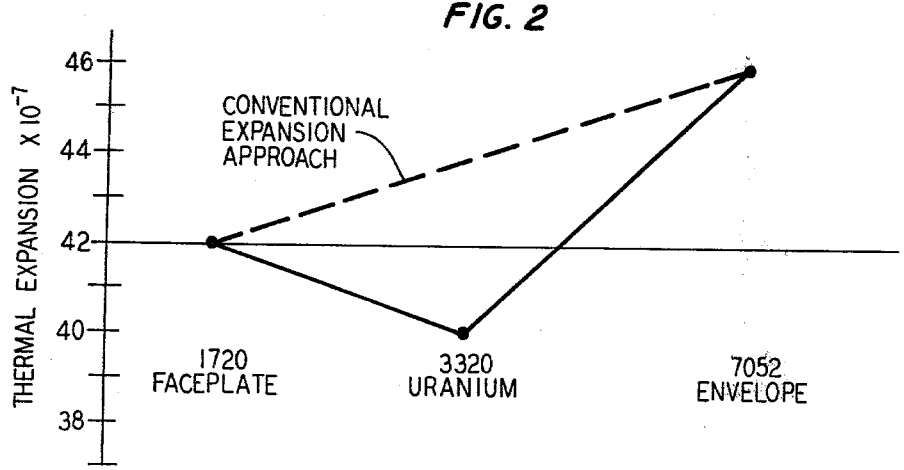
FIG. 2 is a graph depicting the coefficients of expansion of the envelope, faceplate, and stress-absorber shown in FIG. 1.

Cylinder 12 acts as an intermediate stress-absorber between faceplate 10 and envelope 11 and is the primary glass of this graded seal approach. One could expect that the intermediate stress-absorber would have a coefficient of expansion falling somewhere between the coefficients of the faceplate and the envelope. Surprisingly, as shown in FIG. 2, the 3320 uranium glass has a coefficient of expansion of $40 \times 10^{-7}$ which is less than either of the other two glasses, $42 \times 10^{-7}$ for the 1720 faceplate and $46 \times 10^{-7}$ for the 7052 envelope, and one would expect that this would aggravate, rather than alleviate, the situation; however, this is not the case and the uranium glass is highly effective as a stress absorber.

In operation, the cylinder 12 is flame-sealed to, and co-axial with, the envelope 11. Next, liquid honing is used to roughen the outer $\frac{1}{8}$ inch periphery of faceplate 10. This provides a roughened seal area. The butt edge of the cylinder 12 is likewise ground flat, prepatory for sealing.

Next, the solder glass frit 13 is mixed with the appropriate vehicle and uniformly coated onto the roughened butt edge of the cylinder. The frit is maintained in a liquid state by continuously circling the edge of the tube. The envelope is then centrally positioned on the faceplate and the frit allowed to set-up and dry. Advantageously, only a minimum of frit is used—enough only to build up a small bead on the butt edge of the cylinder.

The glass faceplate-envelope combination is then fired in a furnace for 60 minutes at 600° C. Argon gas 17 is piped into the envelope to protect the transparent phosphor-black layer against temperatures over 300° C.–400° C. The flow rate of the argon is typically 5 cu.ft./min. and is adjustable. A weight 16 of approximately 200 grams is used during the fritting cycle to ensure that when the glass frit will compact into a homogenous, voidless layer when it melts. After the 60 minute fritting cycle, the furnace is allowed to cool by natural means and the CRT removed. The electron-gun, deflection plates, etc. are then added and the tube evacuated and sealed in the conventional manner.

It should be noted that any suitable glass frit can be employed providing, of course, that it has an appropriate thermal coefficient of expansion. Additionally, more than one intermediate glass may be used in combination with other frits. This latter approach is appropriate to larger diameter CRT's and also to other types of faceplate material, e.g., sapphire etc. Also, inert gases other than argon may be used to bathe the phosphor coating at a small positive pressure, the gas overflowing out into the oven chamber.

One skilled in the art may make various changes and substitutions without departing from the spirit and scope of the invention.

What is claimed is:

1. A method of joining a first glass member having a first thermal coefficient of expansion to a second glass member having a second thermal coefficient of expansion, said method comprising the steps of:

joining one end of a third glass member having a third thermal coefficient of expansion to said first member and also joining the other end of said third member to said second member, said third member extending lengthwise between said first and second members and acting as an intermediate stress-absorber and having a thermal coefficient of expansion which is less than both said first and said second coefficients of expansion, and applying a glass frit seal between said other end and said second member to join said third and second members.

2. The method according to claim 1 wherein said joining step includes:
flame-sealing said first member to said third member.

3. The method according to claim 2 wherein said first member is comprised of Corning type 7052 glass, said third member is comprised of Corning type 3320 glass and said second member is selected from the group consisting of Corning type 1720 and 1723 glasses.

4. The method according to claim 3 wherein said step of applying said glass frit comprises:
depositing a slurry of Owens-Illinois solder glass frit type SG-7 on said third member; and then
heating said second and third members to fuse said frit.

5. A method of manufacturing a cathode-ray tube of a type that includes an envelope of a first glass and a faceplate of a second glass, said first and second glasses having first and second thermal coefficients of expansion, respectively, comprising the steps of:
flame-sealing one end of a cylindrical glass stress-absorber to said envelope, said stress-absorber having a thermal coefficient of expansion which is less than either said first or said second coefficients;
depositing a slurry containing a glass solder frit on the other end of said stress-absorber;
placing the slurry-coated end of said stress-absorber in aligning engagement with said faceplate; and then
heating said faceplate and stress-absorber to fuse said frit and thereby join said faceplate to said stress-absorber.

6. The method according to claim 5 comprising the further step of, prior to said slurry depositing step:
liquid honing the other end of said stress-absorber and the corresponding regions of said faceplate to roughen the same for said fusing step.

7. The method according to claim 5 comprising the further step of:
applying a positive pressure to said envelope during said heating step to force the other end of said stress-absorber into engagement with said faceplate, thereby to ensure a satisfactory bond.

8. The method according to claim 5 wherein said heating step takes place in an oven and the method comprises the further step of:
flowing an inert gas into said envelope during the heating step to bathe the inner surface of said faceplate thereby to protect any phosphor material priorly deposited thereon.

9. The method according to claim 5 wherein said first glass is Corning type 7052, said second glass is selected from the group consisting of Corning types 1720 and 1723, said stress-absorber is comprised of uranium glass Corning type 3320 and said frit comprises Owens-Illinois type SG-7.

10. A cathode-ray tube which comprises:
an envelope of a first glass having a first thermal coefficient of expansion;
a faceplate of a second glass having a second thermal coefficient of expansion;
an intermediate longitudinally extending cylindrical stress absorbing member of a third glass joining said envelope and faceplate, said intermediate member having one end sealed to said envelope and having a third thermal coefficient of expansion which is less than either said first or said second coefficients of expansion, and
a glass frit seal between the other end of said intermediate member and said faceplate.

11. The cathode-ray tube according to claim 10 wherein said intermediate cylindrical stress-absorbing glass member is flame-sealed at said one end to said envelope.

12. The cathode-ray tube according to claim 11 wherein said first glass is Corning type 7052, said second glass is selected from the group consisting of Corning types 1720 and 1723, said stress-absorbing glass is uranium glass Corning type 3320 and said frit is Owens-Illinois type SG-7.

* * * * *